United States Patent [19]

Götz et al.

[11] 4,222,314
[45] * Sep. 16, 1980

[54] PASSENGER SPACE VENTILATION SYSTEM FOR MOTOR VEHICLES

[75] Inventors: Hans Götz, Böblingen; Albert Hack, Sindelfingen; Hans Winz, Horb, all of Fed. Rep. of Germany

[73] Assignee: Daimler-Benz Aktiengesellschaft, Fed. Rep. of Germany

[*] Notice: The portion of the term of this patent subsequent to Mar. 20, 1996, has been disclaimed.

[21] Appl. No.: 902,052

[22] Filed: May 2, 1978

[30] Foreign Application Priority Data

May 7, 1977 [DE] Fed. Rep. of Germany ....... 2720714

[51] Int. Cl.$^3$ .............................................. B60H 1/24
[52] U.S. Cl. ...................................... 98/2.18; 98/2.04
[58] Field of Search ................... 98/2, 214, 2.15, 2.18, 98/19

[56] References Cited

U.S. PATENT DOCUMENTS

| | | | |
|---|---|---|---|
| 2,750,864 | 6/1956 | Maki | 98/2.18 |
| 2,802,692 | 8/1957 | Stocks | 98/2.18 |
| 2,853,932 | 9/1958 | Freydl | 98/2.18 |
| 2,939,375 | 6/1960 | Herman | 98/2.14 |
| 3,274,915 | 9/1966 | Ziegenfelder | 98/2.18 |
| 3,277,811 | 10/1966 | Fisher | 98/2.05 |
| 3,388,654 | 6/1968 | Aldrich, Jr. et al. | 98/2.18 |
| 3,919,926 | 11/1975 | Yamada | 98/2.03 |
| 4,002,108 | 1/1977 | Drori | 98/2.03 |
| 4,132,158 | 1/1979 | Kania | 98/2.18 |
| 4,144,803 | 3/1979 | Gotz et al. | 98/2.04 |

*Primary Examiner*—Henry C. Yuen
*Attorney, Agent, or Firm*—Craig & Antonelli

[57] ABSTRACT

A passenger space ventilation system for motor vehicles in which stale passenger air is removed toward the outside through openings within the rear area of the body and in which after leaving the passenger space but prior to the discharge into the air flow about the vehicle, the exhaust air from the passenger space is conducted past heated vehicle parts for cooling the same. The air guidance for the stale passenger space air consists at least within the area of the heated vehicle parts of air-guide channels which are formed on the side facing an interior of the vehicle of molded parts that consist of heat-insulating material.

13 Claims, 3 Drawing Figures

PASSENGER SPACE VENTILATION SYSTEM FOR MOTOR VEHICLES

The present invention relates to a passenger space ventilation system for motor vehicles, especially for passenger motor vehicles, in which the stale passenger space air is conducted toward the outside through openings within the rear area of the body and after the exit out of the passenger space but prior to the discharge into the air-flow about the vehicle, is conducted past heated vehicle parts for cooling the same, as disclosed in the German Patent Application No. P 26 03 297. 3 which corresponds to U.S. Pat. No. 4,144,803.

In the above-noted patent, a construction of a passenger space ventilation system is described, in which not only, for example, the tank or luggage space can be ventilated with the aid of the exhaust air coming from the passenger space, but also special floor areas in the luggage space and at the body which are very strongly heated by the heat radiation effected by the exhaust. One manages by the air-guide channels laid into these areas according to the aforementioned patent to shield the luggage space also other areas of the vehicle passenger interior space against a disagreeable overheating.

However, it has been found that the double-walled sheet-metal floors described in the aforementioned patent which were used for the formation of the air-guide channels, still heat up excessively at their top sides as a result of heat conduction. Accordingly, one object of the present invention resides in further insulating the bottom parts of the passenger space in which the described air-guide channels are provided, or also the parts of the luggage space against excessive heat buildup resulting in a heat transfer and heat emission toward the inside. The present invention essentially comprises an air guidance means for passenger space air which includes air-guide channels at least within the area of the heated-up vehicle parts, which channels are formed on the side pointing toward the vehicle interior of molded parts that consist of heat-insulating material. It has been discovered that excellent results are achieved with this construction according to the present invention.

The molded parts may be constructed thereby as plates provided on one side with several parallel grooves disposed adjacent to one another which are adapted to be attached or mounted on the vehicle floor or on the body sheet-metal members adjoining the heated-up vehicle parts. As a result of this construction, the air-guide channels are composed of two parts, whereby the part facing the vehicle interior space is to exercise as great as possible a heat-insulation or heat-damming effect. It has been found that it is very advantageous if the body sheet-metal members are provided with indentations, embossments, ribs or the like which produce as large a flow cross section as possible for the air flowing therethrough. Additionally, if the grooves serving for the formation of the air channels are mutually offset in the insulating molded parts by support- and bearer-webs, both a strong air conduction favorable from a streamlining point of view as well as a uniform load distribution can be achieved. This can be achieved by the subdivision of the air-guide channels into several small air ducts or flutes disposed adjacent one another, and it is possible also to use such molded parts, for example, at places which heretofore could be constructed in a heat-insulating manner only by the arrangement of separate air-guide channels. Thus, with vehicles which include angularly shaped air-guide channels arranged in the luggage space within the area of the exhaust installation according to the aforementioned patent, a good heat-insulation of the luggage space can be achieved if a one-piece molded part made of synthetic plastic material is provided for the mounting thereof on the luggage space floor, such part being provided with several air-guide grooves deflected or turned in a manner favorable from a streamlining point of view.

Of course, it is advantageous if at least a part of the air-guide grooves of the molded part according to the present invention is form fitted to the aforementioned embossments in the luggage space or at other parts of the body's overall air-guidance cross section, because a larger flow cross section can be achieved thereby without danger of the impairment of the rigidity of the molded parts. In all those cases in which the molded parts form directly the inner covering of the vehicle, for example, in luggage space floors, the side facing the vehicle interior may be provided directly with a damage protective layer.

Accordingly, it is an object of the present invention to provide a passenger space ventilation for motor vehicles, especially for passenger motor vehicles, which avoids by simple means the aforementioned shortcomings and drawbacks encountered in the prior art.

Another object of the present invention resides in a passenger space ventilation system for motor vehicles, in which the heat-up of body parts, especially the top sides thereof facing interior spaces, is effectively minimized by simple means.

A further object of the present invention resides in a vehicle passenger space ventilation system for motor vehicles which effectively cools areas of the body heated up, for example, by the exhaust system, yet assures a far reaching heat-insulation with respect to interior vehicle spaces.

A still further object of the present invention resides in a passenger space ventilation system which provides good heat insulation in conjunction with air flow cross sections to improve the cooling effect thereof when said air is passed along heated body parts.

Still another object of the present invention resides in a ventilation system for passenger spaces of motor vehicles which not only assures a strong air flow to effect maximum cooling but additionally permits a uniform distribution of the load.

Another object of the present invention resides in a passenger space ventilation system for motor vehicles which effectively ventilates the passenger space and at the same time effectively cools heated-up parts of the body, such as the luggage space floor, while minimizing radiation of heat into the luggage space or other interior parts of the vehicle.

These and other objects, features and advantages of the present invention will become more apparent from the following description when taken in conjunction with the accompanying drawing which shows, for purposes of illustration only, one embodiment in accordance with the present invention, and wherein.

Figure 1:
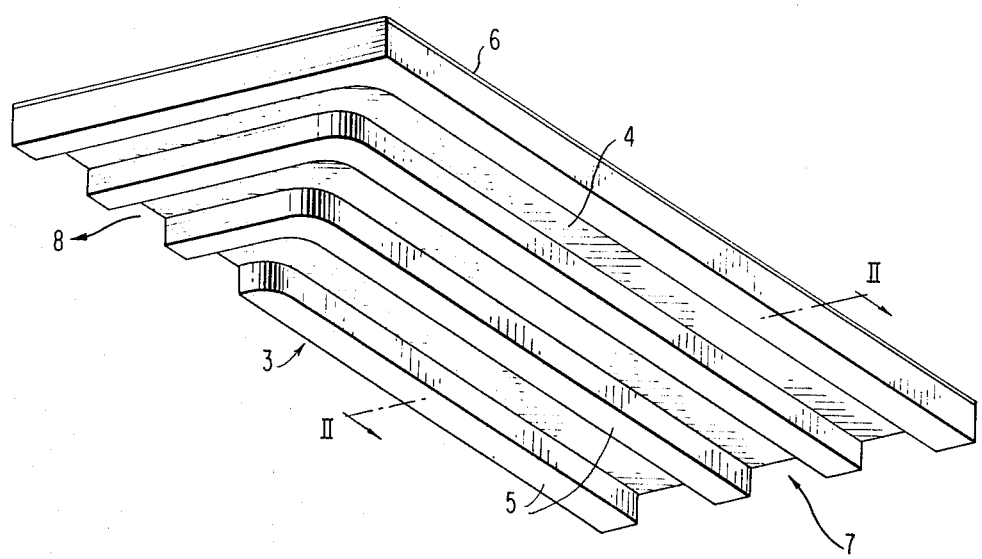
FIG. 1 is a perspective view of a synthetic plastic molded part according to the present invention which can be used for the formation of air guide channels within the area of the luggage space.
Figure 2:
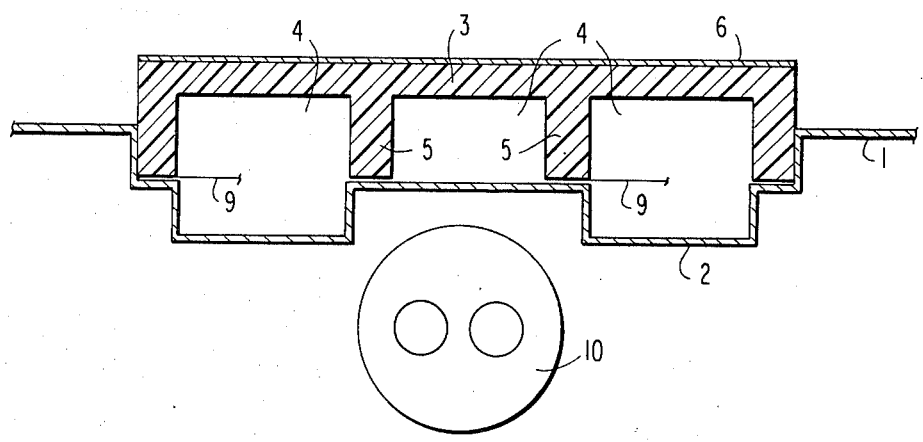
FIG. 2 is a cross-sectional view, on an enlarged scale, through the molded part of FIG. 1, taken along line II—II thereof, whereby the molded part is mounted on the luggage space floor.

Referring now to the drawings wherein like reference numerals are used throughout the three views to designate like parts, a synthetic resinous molded part is shown in FIG. 1 which, can be seen from FIG. 2, rests on a body floor 1 either loosely, glued thereto, or screwed together therewith, which body floor in the illustrated embodiment may be the floor of the luggage space. This body floor 1 may be provided, dependent on the space conditions, with embossments 2 formed by grooves or flutes for the increasing of the channel cross section.

The synthetic plastic molded part generally designated by reference numeral 3 may be made of hard foam material or the like of any conventional known type, but may also be assembled of plate material and webs, suitably connected to one another. The synthetic resinous molded part 3 includes grooves 4 open in the downward direction which are separated with respect to one another by webs 5. The webs 5 serve for achieving rigidity and are so constructed that the forces exerted onto the flat top side of the synthetic resinous molded part 3 can be absorbed at any time in such a manner that a deformation will not take place. The flat top side is closed off against the outside by a reinforced protective layer 6 which may be made of cardboard, sheet-metal, glass-fiber-reinforced plastic material or the like. The air, as in the aforementioned patent, also comes from the passenger space ventilation system in the direction of the arrow 7, enters into into the air-guide or air-conduction channels formed by the grooves 4 and the embossments 2 and thereby absorbs a large portion of the heat produced, for example, by the exhaust system 10. This heat is given off in the direction of the arrow 8 to the airflow about the vehicle.

As is further shown in FIG. 2, if leakage air-flows between the molded part 3 and the body floor 1 are to be avoided with certainty, a foil 9 may be mounted on the free end face of the webs 5, which may be constructed, for example, as adhesive foil or sheet of any known type.

Figure 3:
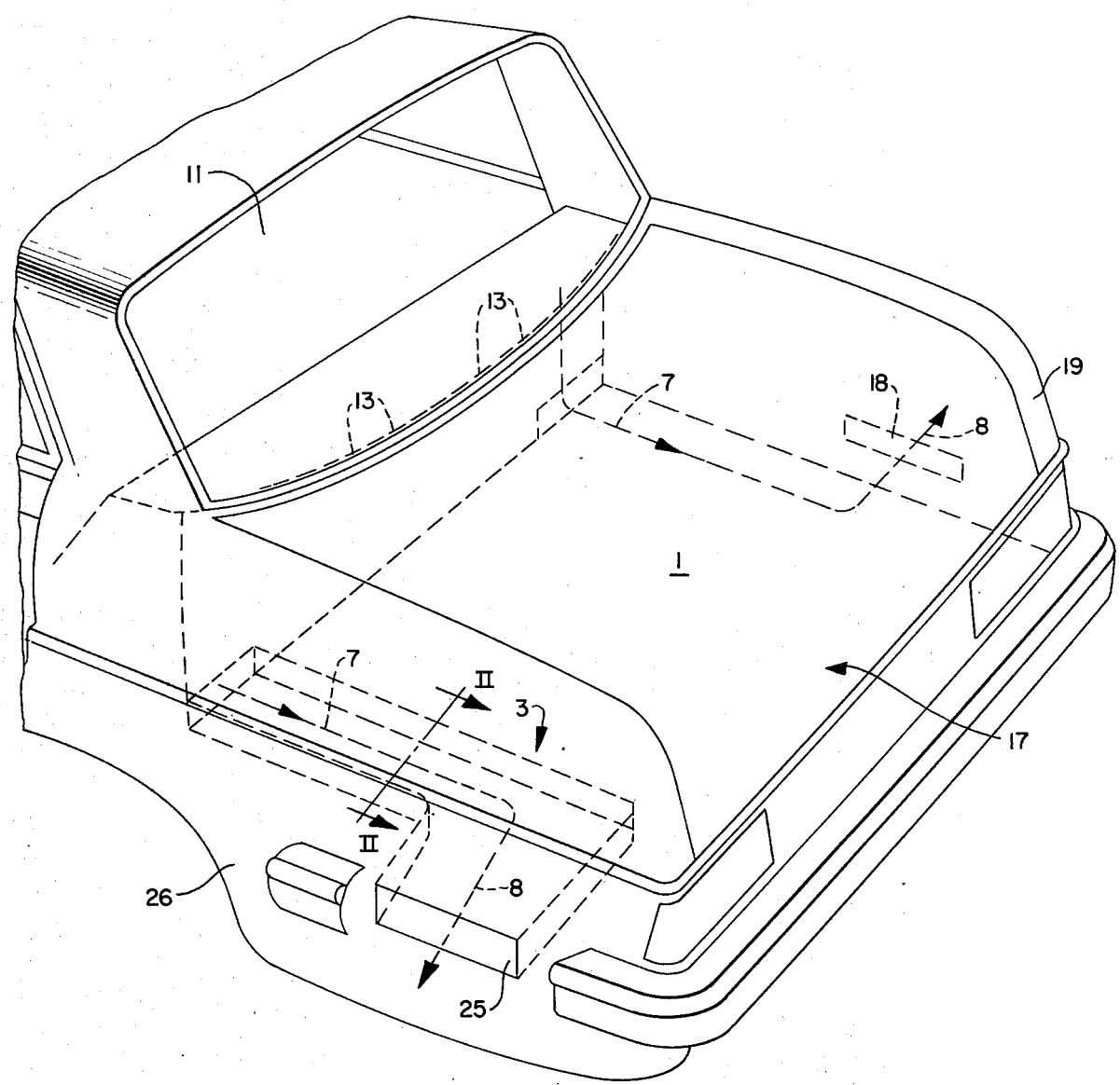
FIG. 3 is a perspective view of the passenger space ventilation system of the present invention disposed in the rear of a motor vehicle.

With reference to FIG. 3, the air guide means comprising the synthetic plastic molded part 3 is shown operably mounted in the rear of a motor vehicle. Specifically, part 3 is shown flush mounted against the body floor 1 of the vehicle luggage space 17. While only one part 3 is depicted by broken lines proximate the near vehicle fender 26, it is to be inferred that a second such part 3 is located proximate to the far fender 19. Both the near and far parts 3 are respectively associated with lateral discharge slots or openings 25 and 18.

In typical operation, a pair of molded parts 3 might be flush mounted on the body floor 1 of a luggage space 17 located in the rear of the motor vehicle. As can be best understood by reference to FIG. 3, ventilation air located in the passenger space 11 is exhausted through openings 13 into the luggage space 17. As indicated by the air direction flow path 7, the exhausted passenger space air enters into the molded parts 3, traveling therethrough by flowing through the grooves 4 as shown in FIGS. 1 and 2. The air thus flowing through part 3 comes into contact, either directly or indirectly, with the body floor 1 of the luggage space 17 and removes heat therefrom. The heated air is then expelled in the direction 8 out through lateral discharge slots or openings 18, 25 into the air flow about the moving vehicle. Typically, the lateral discharge slots or openings 18, 25 would be located in vehicle fenders 19, 26. The inside of the luggage space is thus protected by the molded parts 3 against an undesired buildup of heat, since the heated air escapes laterally into the atmosphere.

While we have shown and described only one embodiment in accordance with the present invention, it is understood that the same is not limited thereto, but is susceptible of numerous changes and modifications as known to those skilled in the art, and we therefore do not wish to be limited to the details shown and described herein but intend to cover all such changes and modifications as are encompassed by the scope of the appended claims.

We claim:

1. A passenger space ventilation system for a motor vehicle which includes a vehicle body and discharge openings provided within a rear area of the vehicle body for discharging stale passenger air from the passenger space to the atmosphere, and means for conducting air from the passenger space past at least one heated vehicle part for cooling the same prior to a discharge of the air through the discharge openings, characterized in that the conducting means includes air guide means arranged at least within an area of the at least one heated vehicle part, the air-guide means is formed on a side thereof facing an interior of the vehicle by at least one molded part, and in that the at least one molded part consists essentially of a heat-insulating material.

2. A passenger space ventilating system according to claim 1, characterized in that the at least one molded part is constructed as a plate member provided on one side thereof with a plurality of parallel grooves disposed adjacent one another, and in that the at least one plate member is adapted to be mounted on parts of the vehicle body adjoining the heated vehicle parts.

3. A passenger space ventilation system according to claim 2, characterized in that the vehicle body includes a vehicle floor at least a portion of which is disposed adjacent the at least one heated vehicle part, and in that the plate member adapted to be mounted on the vehicle floor.

4. A passenger space ventilation system according to claim 1, characterized in that air guide means includes a plurality of grooves for forming air-guide channels, and in that web means are arranged between the air guide channels for providing rigidity to the at least one molded part.

5. A passenger space ventilation system according to claim 1, for a motor vehicle which includes a luggage space and an exhaust system characterized in that the at least one heated part, a portion of the exhaust system, the air guide means includes angularly shaped air-guide channel means arranged in the luggage space within an area of the exhaust system, the at least one molded part is formed in one piece and is adapted to be mounted on a floor of the luggage space, air-guide grooves are provided in the molded part and arranged so as to deflect the air in a manner favorable from a streamlining point of view, and in that the heat insulating material is a synthetic resinous material.

6. A passenger space ventilation system according to claim 5, characterized in that air guide grooves include air deflection radii of curvature are provided at the deflection areas having predetermined radii of curvature.

7. A passenger space ventilation system according to claim 5 or 6 characterized in that the floor of the luggage space is provided with embossments at least in an area of the heated part, and in that at least a part of the air-guide grooves form together with the embossments the overall cross section of the air guide means.

8. A passenger space ventilation system according to claim 1 or 5, characterized in that the at least one molded part includes a substantially flat side facing the of the vehicle interior and in that a protective layer for protecting the at least one molded part against damages is arranged on the substantially flat side.

9. A passenger space ventilation system according to claim 4, characterized in that a sealing foil means for preventing air flow leaks between the molded part and an adjoining vehicle body part is mounted on a free end face of the web means.

10. A passenger space ventilation system according to claim 9, characterized in that the at least one molded part includes a substantially flat side facing the of the vehicle interior and in that a protective layer for protecting the at least one molded part against damages is arranged on the substantially flat side.

11. A passenger space ventilation system according to claim 7, characterized in that web means are arranged between the air guide grooves for providing rigidity to the at least one molded part.

12. A passenger space ventilation system according to claim 2 or 4, characterized in that air guide grooves include air deflection radii of curvature are provided at the deflection areas having predetermined radii of curvature.

13. A passenger space ventilation system according to claim 12, for a vehicle which includes a vehicle floor provided with embossments at least in an area of the at least one heated part, characterized in that the air guide means includes air-guide grooves, and in that at least a part of the air guide grooves form together with the embossments the overall cross-section of the air guide means.

* * * * *